US007152309B2

(12) United States Patent
Liao

(10) Patent No.: US 7,152,309 B2

(45) Date of Patent: Dec. 26, 2006

(54) PRESS-CONNECTING PLIERS FOR COAXIAL PINS OF MULTIPLE SPECIFICATIONS

(75) Inventor: Chien-Chou Liao, Taipei Hsien (TW)

(73) Assignee: Hanlong Industrial Co., Ltd., Taipei Hsien (TW)

( * ) Notice: Subject to any disclaimer, the term of this patent is extended or adjusted under 35 U.S.C. 154(b) by 478 days.

(21) Appl. No.: 10/698,456

(22) Filed: Nov. 3, 2003

(65) Prior Publication Data

US 2005/0091841 A1 May 5, 2005

(51) Int. Cl.
*B23P 19/00* (2006.01)

(52) U.S. Cl. ............................ 29/751; 29/758; 29/753; 29/748; 29/761; 72/129; 72/409.14; 7/107; 7/158

(58) Field of Classification Search .......... 29/751–753, 29/758, 828, 268, 282, 850; 439/133–136; 81/417, 399, 427.5; 72/412, 461, 477; 7/132, 7/107

See application file for complete search history.

(56) References Cited

U.S. PATENT DOCUMENTS 5,168,592 A * 12/1992 Jee ................................ 7/107
5,913,933 A * 6/1999 Beetz et al. ............. 72/409.16
5,941,120 A * 8/1999 Jee .......................... 72/409.14
6,112,404 A * 9/2000 Tarpill ......................... 29/751
6,698,090 B1 * 3/2004 Hsu ............................ 29/751
6,732,393 B1 * 5/2004 Liao .............................. 7/158
6,948,234 B1 * 9/2005 Steiner ........................ 29/758
2003/0066186 A1 * 4/2003 Lu ............................. 29/758

* cited by examiner

*Primary Examiner*—Minh Trinh
(74) *Attorney, Agent, or Firm*—Bacon & Thomas, PLLC

(57) ABSTRACT

The pair of press-connecting pliers mainly have a first handle provided with a press-connecting die block, the press-connecting die block at least has two set of press-connecting sections allowing diversion and position changing, while the second handle can drive a press-connecting head to move toward the press-connecting die block to press connect a set of wire and pin in cooperation with the two set of press-connecting sections capable of being opposite to the press-connecting head after diversion; and by the functions of diversion and position changing of the two set of press-connecting sections, the press-connecting pliers at least can do press connecting of pins and wires of two specifications.

7 Claims, 6 Drawing Sheets

PRESS-CONNECTING PLIERS FOR COAXIAL PINS OF MULTIPLE SPECIFICATIONS

BACKGROUND OF THE INVENTION

1. Field of the Invention

The present invention is related to a pair of press-connecting pliers for coaxial pins of multiple specifications, and especially to a pair of press-connecting pliers for connecting pins and wires of at least two specifications by diversion and position changing of a press-connecting die block to be opposite to a press-connecting head, thereby the pliers can do press connecting of pins and wires of various specifications.

2. Description of the Prior Art

Coaxial wires with pins are divided into several classes in pursuance of various functions as well as their modes of using; e.g., wires for sound channels, for broadband networks and for cable television sets using pins with different specifications and sizes; thereby when in connecting pins with wires, generally, different press-connecting pliers are required for wires and pins with different specifications.

While in using a pair of press-connecting pliers, it is practiced mainly in that two handles are provided thereon with a press-connecting die block of a specification, and a corresponding press-connecting head inserts a wire onto the tailing ends of a pin and then put them on the press-connecting die block, after that, the handles are pressed to get close to each other to render the press-connecting head to move toward the wire and the pin on the press-connecting die block, this can force the pin to wrinkle to clamp tight the wire, and shaping of the wire and the pin can be completed.

The above stated conventional press-connecting pliers must be changed in pursuance of wires and pins with different specifications, thereby an effect of wrinkling and shaping of the wires and pins with different specifications can be obtained; this not only makes quite inconvenience in carrying, but also makes inconvenience in use.

Therefore, it is the gist of the present invention to provide a pair of press-connecting pliers for press connecting pins and wires of various specifications.

SUMMARY OF THE INVENTION

In view of the above statement, the inventor of the present invention successfully developed a pair of press-connecting pliers for coaxial pins of multiple specifications based on his professional experience of years in studying, designing and manufacturing same kind of products and after repeated experiments and tests.

Whereas, the press-connecting pliers for coaxial pins of multiple specifications of the present invention mainly have a first one of two handles provided with a press-connecting die block, the press-connecting die block at least has two set of press-connecting sections allowing diversion and position changing, while the second one of the two handles can drive a press-connecting head to move toward the press-connecting die block to press connect a set of wire and pin in cooperation with the two set of press-connecting sections capable of being opposite to the press-connecting head after diversion, thus the wires and pins can be press connected; and by the functions of diversion and position changing of the two set of press-connecting sections, the press-connecting pliers at least can do press connecting of two set of pins and wires of two specifications.

The object of the present invention is: by diversion of the press-connecting die block on the first handle to make the press-connecting sections with different specifications on the press-connecting die block be aligned with the press-connecting head, so that the press-connecting pliers can do press connecting of pins and wires of various specifications.

The other object of the present invention is: the press-connecting die block is fixed on the first handle by using bolts, so that the press-connecting die block can be changed timely and locked by the bolts, this enlarges the scope of use of the press-connecting pliers.

The present invention will be apparent in its content and the effect to be achieved after reading the detailed description of the preferred embodiment thereof in reference to the accompanying drawings.

DETAILED DESCRIPTION OF THE PREFERRED EMBODIMENT

Figure 1:
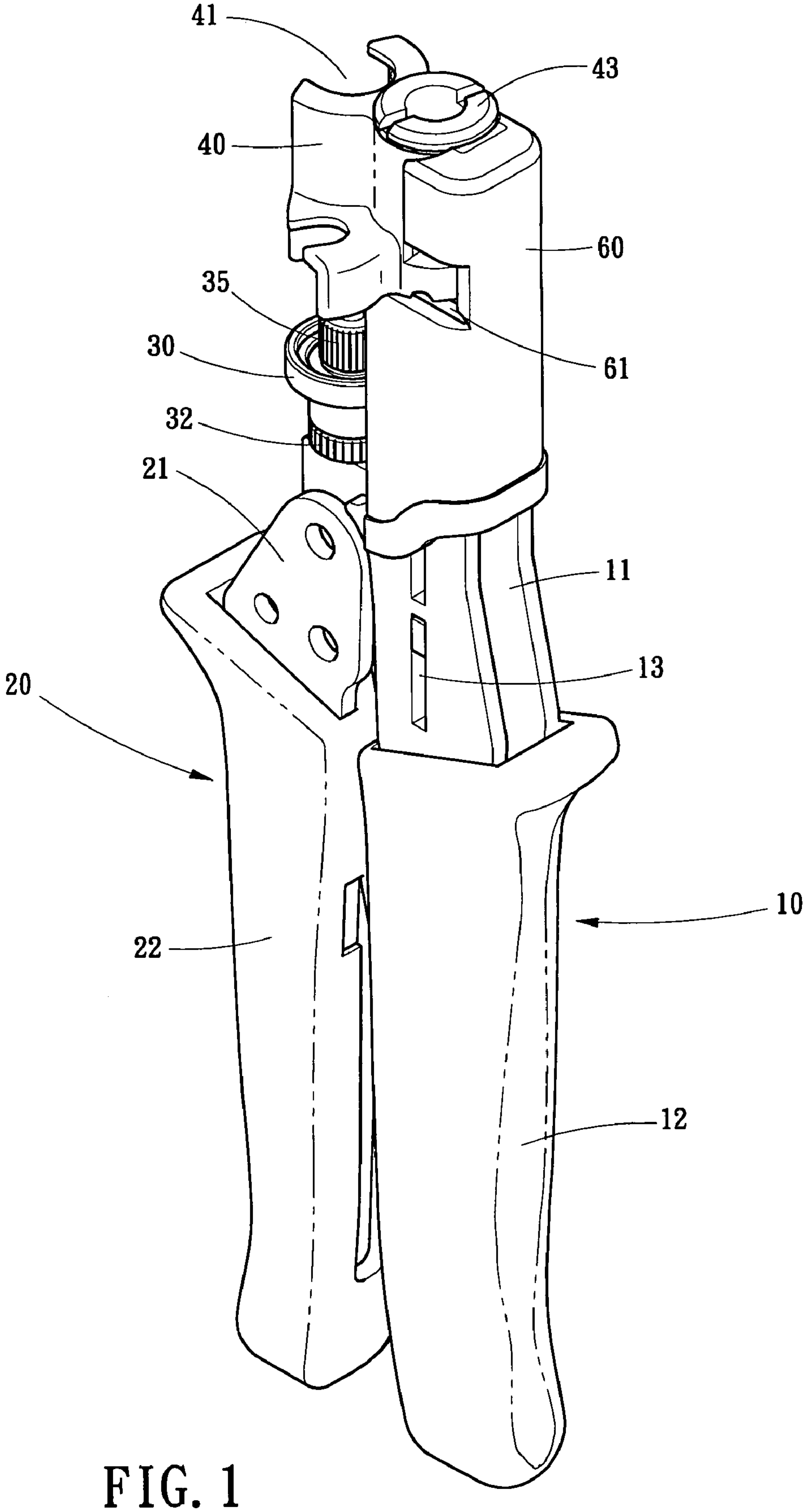
FIG. 1 is a schematic perspective view showing the appearance of the present invention.

The press-connecting pliers for coaxial pins of multiple specifications of the present invention, as are shown in FIGS. 1–4, mainly comprises a first handle 10, a second handle 20, a press-connecting head 30 and a press-connecting die block 40. Wherein:

The first handle 10 has two fixing sheets 11 on its upper end, and has a holding sleeve 12 on its lower end, the fixing sheets 11 are provided each with two slide slots 13 in correspondence with each other, and the two fixing sheets 11 are provided therebetween with a fixing block 14 locked with bolts. The fixing block 14 has thereon a screw-connecting portion 15 and a positioning portion 16 which includes a positioning member 17 and a restoring spring 18.

The second handle 20 has two fixing sheets 21 on its upper end, and has a holding sleeve 22 on its lower end, the two fixing sheets 21 are provided therebetween with a linkage portion 23 which is provided with a slide block 24 in alignment with the slide slots 13 respectively, so that press closing of the first handle 10 to the second handle 20 can render sliding of the slide block 24 of the linkage portion 23 in the slide slots 13, and push the linkage portion 23 upwardly. The linkage portion 23 further is provided with a screw-connecting hole 25 for mounting by screw connecting of the press-connecting head 30. And a link 50 is provided between the first handle 10 with the second handle 20.

The press-connecting head 30 is provided on the second handle 20, and has a thread portion 31 on its bottom in opposition to the screw-connecting hole 25 of the linkage portion 23, in order that the press-connecting head 30 can be mounted by screw connecting on the linkage portion 23, and can be moved by the linkage portion 23 for displacement. The thread portion 31 is provided with an adjusting screw 32 which can render the press-connecting head 30 to make height adjustment on the linkage portion 23.

The press-connecting head 30 has in the interior of its upper end a press-connecting recess 33 with a plurality of steps; the press-connecting recess 33 is designed for pins of various specifications. The press-connecting head 30 further is provided with a screw hole 34 centrally on its upper end, this allows mounting of a positioning bolt 35 thereon. The positioning bolt 35 has a through hole 36 on its upper end in order that central core wires of cable television can be extended into the through hole 36.

The press-connecting die block 40 at least has two set of press-connecting sections 41 for placing therein two set of wires and pins of different specifications (there are three sets in the embodiment shown). And the press-connecting die block 40 has a hole 42 to slip over the screw-connecting portion 15 of the fixing block 14, it is locked on the screw-connecting portion 15 by extending a screw-connecting bolt 43 into the hole 42; thereby the press-connecting die block 40 can make diversion to change the positions of the press-connecting sections 41 by rotating on the first handle 10 about the screw-connecting portion 15, so that one of the press-connecting sections 41 is aligned with the press-connecting head 30. And the press-connecting die block 40 is provided with at least a positioning groove 44 for engagement therein of the positioning member 17 of the positioning portion 16.

Thereby, the press-connecting die block 40 can divert on the first handle 10; with the positioning portion 16 formed between the press-connecting die block 40 and the fixing block 14, and the positioning portion 16 is composed of the positioning member 17 and the restoring spring 18, hence when the press-connecting die block 40 diverts, the positioning member 17 can compress the restoring spring 18. When one of the press-connecting sections 41 is rotated to its proper position to be aligned with the press-connecting head 30, the positioning groove 44 is also in alignment with the positioning member 17, so that the positioning member 17 is acted by an elastic restoring force of the restoring spring 18 to move toward the positioning groove 44 and is engaged in the positioning groove 44; in this way, diversion and positioning of the press-connecting die block 40 to be aligned with the press-connecting head 30 can be achieved. At this time, by press closing of the first handle 10 to the second handle 20, the press-connecting head 30 can be moved by the linkage portion 23 toward the press-connecting die block 40.

Figure 5:
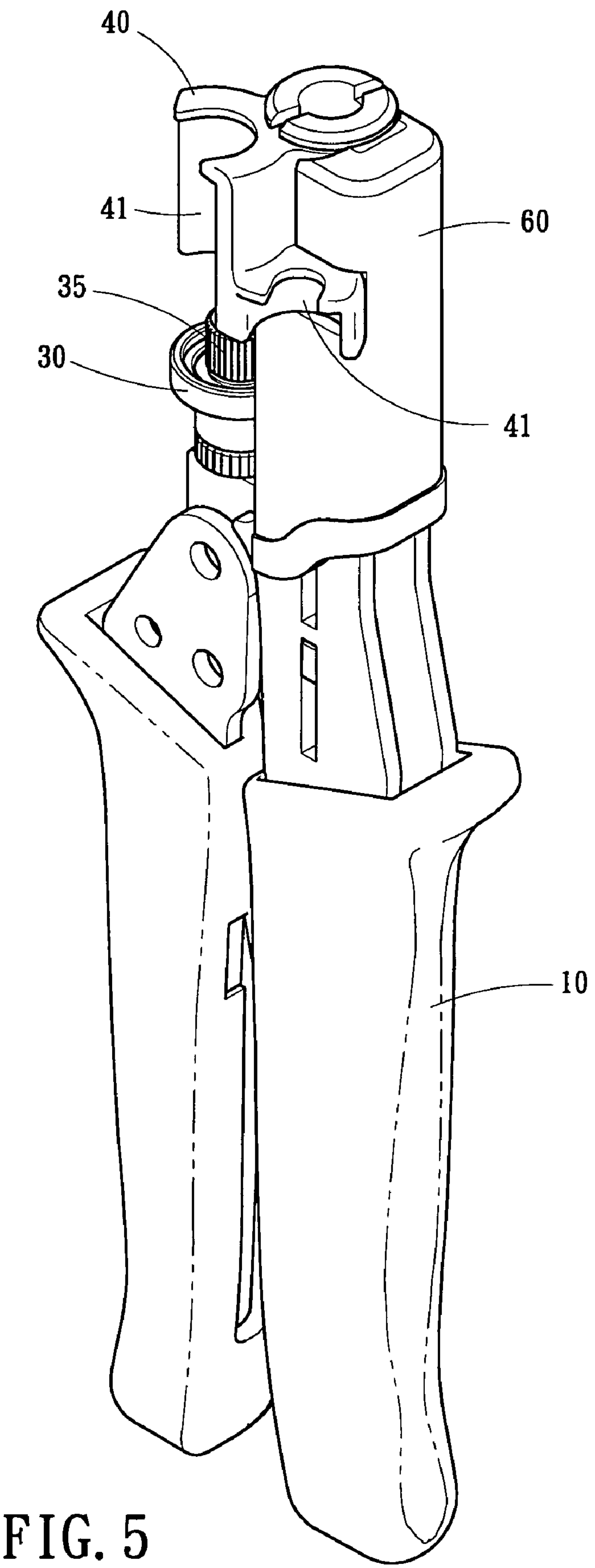
FIG. 5 is a schematic perspective view showing a second position of a press-connecting die block of the present invention.
Figure 6:
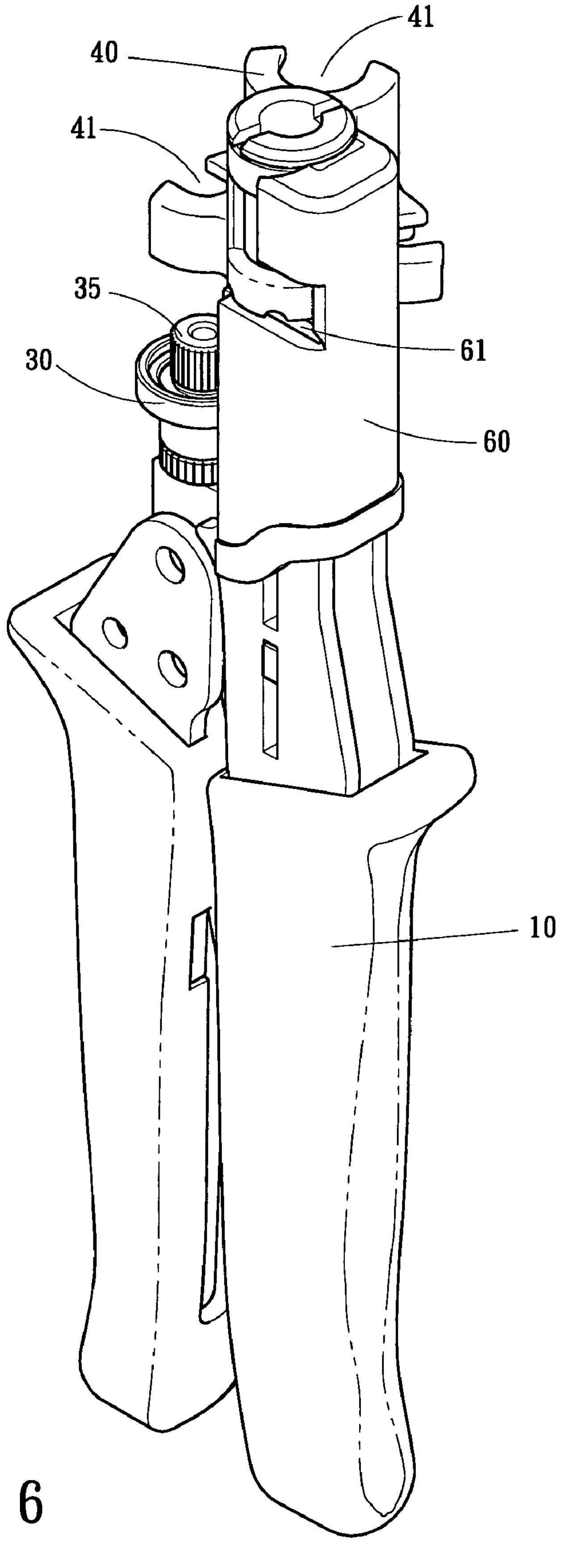
FIG. 6 is a schematic perspective view showing a first position of a press-connecting die block of the present invention.

Referring simultaneously to FIGS. 1, 5 and 6, the press-connecting die block 40 at least has two set of press-connecting sections 41, hence by diversion of the press-connecting die block 40, one of the press-connecting sections 41 is aligned with the press-connecting head 30, so that press connecting on two set of wires and pins can be effected. And one can choose whether a positioning bolt 35 shall be added in pursuance of the requirement of the wires and pins, thereby a pair of pliers suitable for press connecting of pins and wires of multiple specifications is provided.

Figure 2:
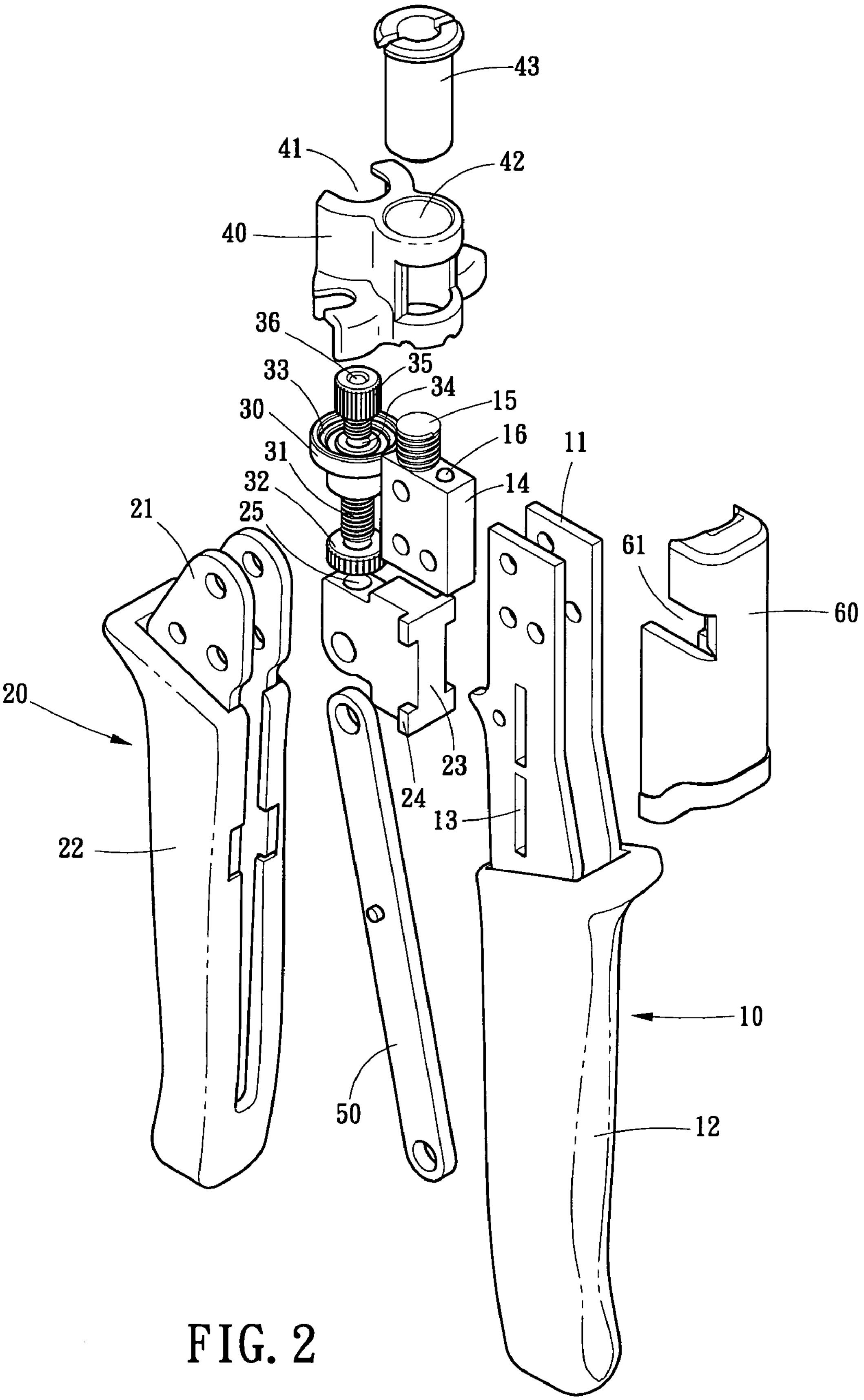
FIG. 2 is an analytical perspective of the present invention.
Figure 3:
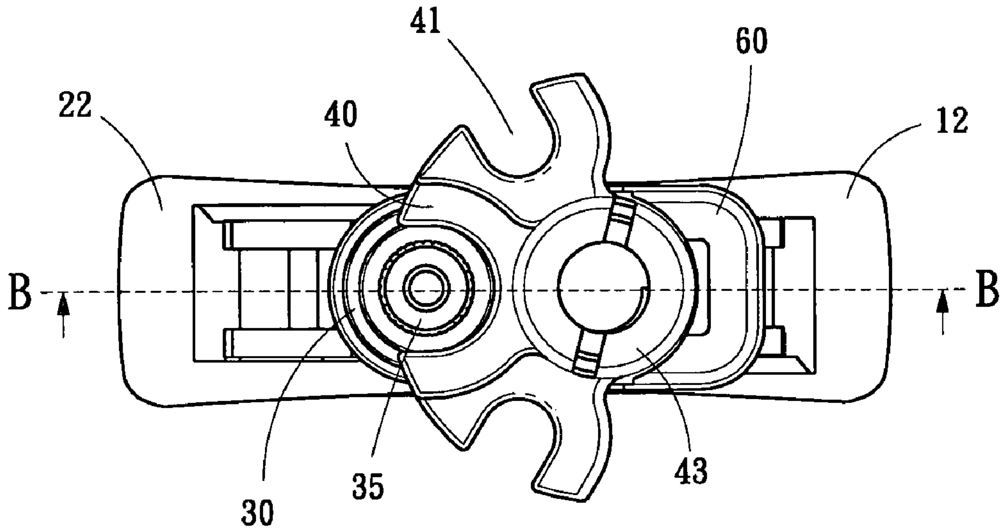
FIG. 3 is bottom view of the present invention.
Figure 4:
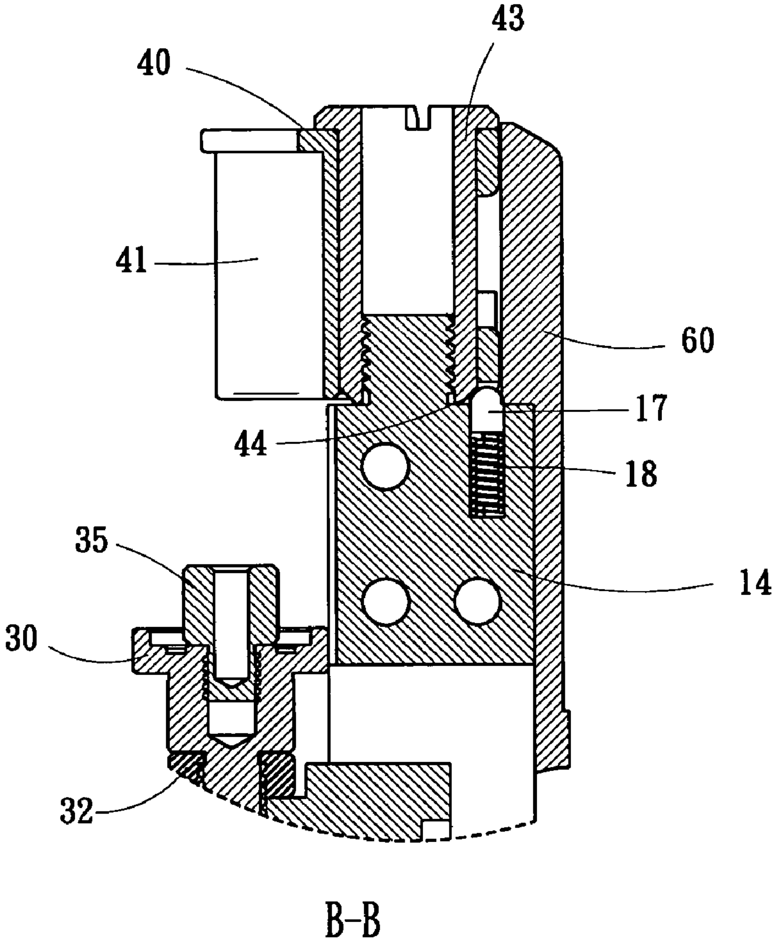
FIG. 4 is a schematic sectional view showing the press-connecting area of the present invention.

Additionally, the first handle 10 can be added with a safety sheath 60 at the lateral external side of the press-connecting die block 40 and the fixing sheets 11 to avoid exposure of the fixing sheets 11, the linkage portion 23 and the press-connecting die block 40. The safety sheath 60 has a notch 61 corresponding by position to either of the press-connecting sections 41, so that when the press-connecting die block 40 diverts, such as is shown in FIG. 2, it can move one of the press-connecting sections 41 at either side thereof into the notch 61 for the purpose of protection.

Figure 7:
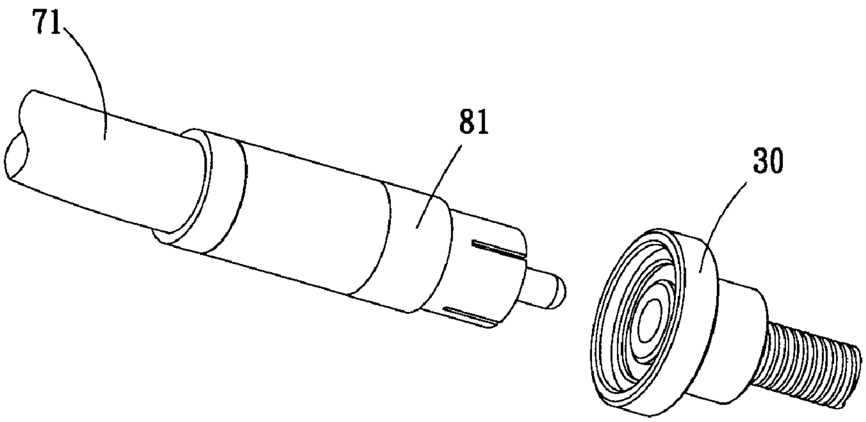
FIG. 7 is a schematic perspective view showing application of a press-connecting head to a wire for sound channel of the present invention.
Figure 8:
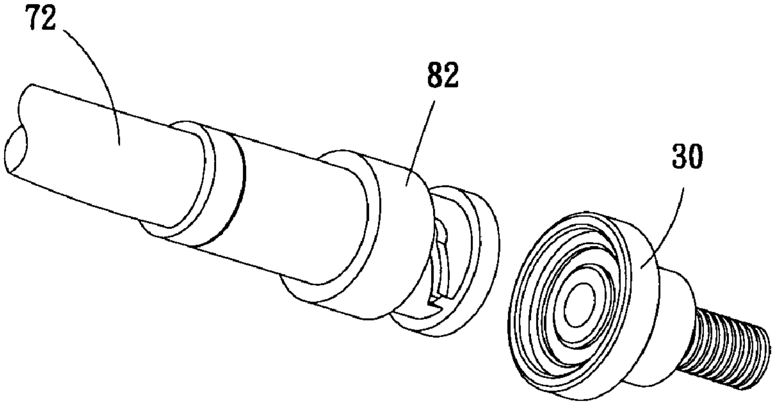
FIG. 8 is a schematic perspective view showing application of a press-connecting head to another wire for sound channel of the present invention.
Figure 9:
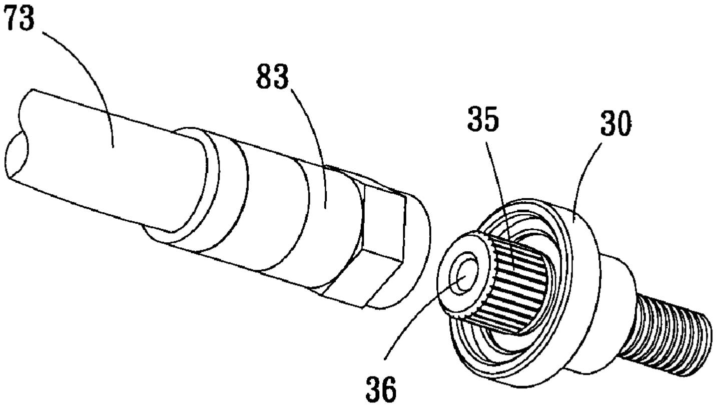
FIG. 9 is a schematic perspective view showing application of a press-connecting head to a signal line of a cable television set of the present invention.

Referring to FIGS. 7–9 which are schematic perspective views showing the press-connecting head 30, wires 71–73 and pins 81–83 of the present invention in press connecting the wires 71–73 with the pins 81–83. When the press-connecting head 30 does press connecting on the wire 71 for sound channel and the pin 81 of the RCA type meeting the specification of the wire 71, on the wire 72 for broadband networks and the pin 82 of the BNC type meeting the specification of the wire 72 as well as on the wire 73 for cable television sets and the pin 83 of the F type meeting the specification of the wire 73, one can choose whether the positioning bolt 35 shall be added in pursuance of the features of the pins for the different wires.

One thing is worth mentioning, as shown in all the drawings attached, the press-connecting pliers for coaxial pins of multiple specifications of the present invention is provided with the divertible press-connecting die block 40, the press-connecting die block 40 has at least the two set of press-connecting sections 41, with using the press-connecting head 30 and the positioning bolt 35, the press-connecting pliers can do press connecting of pins and wires of various specifications.

In the meantime, the press-connecting die block 40 can allow changing of itself by the provision for screw connecting of the screw-connecting bolt 43 with the screw-connecting portion 15 of the fixing block 14, thereby the scope of application of the press-connecting pliers can be wider, and thereby a pair of press-connecting pliers can be used to align and press connect one press-connecting die block 40 chosen from various press-connecting die blocks with the press-connecting head 30 for various wires and pins.

However, the abovementioned names of members are only for illustrating the present invention and not for giving any limitation to the scope of the present invention. It will be apparent to those skilled in this art that various equivalent modifications or changes without departing from the spirit of this invention shall also fall within the scope of the appended claims.

The invention claimed is:

1. A pair of press-connecting pliers for multiple coaxial wire and pin specifications, comprising:

- a first handle having fixing sheets located on an upper end thereof, the fixing sheets provided with a plurality of slide slots;
- a second handle;
- a linkage portion connecting the first and second handles, the linkage portion provided with a slide block in alignment with the slide slots of the fixing sheets;
- a fixing block fixedly connected to the first handle;
- a press-connecting head provided on the second handle;
- a press-connecting die block pivotally connected to the first handle;
- wherein when the first handle is press closed with the second handle, the slide block slides along the slide slots to move said press-connecting head for displacement toward the press-connecting die block;

wherein the fixing block has a screw-connecting portion and a positioning portion, the press-connecting die block having a hole arranged to slip over the screw-connecting portion such that the press-connecting die block is adapted for making diversion on said first handle; and wherein the press-connecting die block is arranged to divert and has at least two sets of press-connecting sections, whereby said press-connecting pliers are adapted for press connecting of pins and wires of at least two different classes of coaxial wires.

2. The pair of pliers according to claim 1, wherein said first handle and said second handle are provided therebetween with a link.

3. The pair of pliers according to claim 1, wherein said positioning portion includes a positioning member and a restoring spring, said press-connecting die block is provided with at least a positioning groove for engagement therein of said positioning member to render said press-connecting die block to divert.

4. The pair of pliers according to claim 1, wherein said press-connecting head and said linkage portion are provided therebetween with an adjusting screw to adjust height of said press-connecting head.

5. The pair of pliers according to claim 1, wherein said press-connecting head has a stepped press-connecting recess thereon in opposition to said press-connecting die block.

6. The pair of pliers according to claim 1, wherein said press-connecting head has a positioning bolt thereon in opposition to said press-connecting die block.

7. The pair of pliers according to claim 1, wherein said first handle is added with a safety sheath at a lateral external side of said first handle and said press-connecting die block, said safety sheath has a notch corresponding by position to either of said press-connecting sections such that when said press-connecting die block diverts, it moves either of said press-connecting sections into said notch.

* * * * *